(12) United States Patent
Burroughs et al.

(10) Patent No.: US 7,447,834 B2
(45) Date of Patent: *Nov. 4, 2008

(54) MANAGING SERIAL ATTACHED SMALL COMPUTER SYSTEMS INTERFACE COMMUNICATIONS

(75) Inventors: John V. Burroughs, East Sandwich, MA (US); Matthew Long, Uxbridge, MA (US); Bassem N. Bishay, Attleboro, MA (US); Douglas E. Peeke, Shrewsbury, MA (US)

(73) Assignee: EMC Corproation, Hopkinton, MA (US)

( * ) Notice: Subject to any disclaimer, the term of this patent is extended or adjusted under 35 U.S.C. 154(b) by 118 days.

This patent is subject to a terminal disclaimer.

(21) Appl. No.: 11/324,973

(22) Filed: Jan. 3, 2006

(65) Prior Publication Data
US 2007/0067417 A1 Mar. 22, 2007

Related U.S. Application Data

(63) Continuation-in-part of application No. 11/169,473, filed on Jun. 29, 2005.

(51) Int. Cl.
*G06F 12/00* (2006.01)

(52) U.S. Cl. ...................... 711/112; 711/114
(58) Field of Classification Search ................. 711/112, 711/114
See application file for complete search history.

(56) References Cited

U.S. PATENT DOCUMENTS 6,831,831 B2 12/2004 Bicknell et al.
6,915,381 B2 7/2005 Fujie et al.
6,928,509 B2 8/2005 Surugucchi (Continued)

FOREIGN PATENT DOCUMENTS

EP 0 967 552 A2 12/1999

(Continued)

OTHER PUBLICATIONS

Burroughs, John V., et al., U.S. Appl. No. 11/169,473, filed Jun. 29, 2005, entitled "Techniques for Providing Communications in a Data Storage System Using a Single IC for Both Storage Device Communications and Peer-to-Peer Communications".

*Primary Examiner*—Reginald G Bragdon
*Assistant Examiner*—Aracelis Ruiz
(74) *Attorney, Agent, or Firm*—BainwoodHuang

(57) ABSTRACT

Data storage equipment includes a first storage processor comprising a processing circuit and a collection of packaged integrated circuit devices which has a first set of ports and a second set of ports; a second storage processor; and an interconnect coupled between the first and second storage processors. The processing circuit of the first storage processor is adapted to execute as follows. The collection of packaged integrated circuit devices of the first storage processor is configured to provide (i) communications to a set of storage devices through the first set of ports of the collection of packaged integrated circuit devices and (ii) other communications to the second storage processor through the second set of ports of the collection of packaged integrated circuit devices. Communications is passed between the first storage processor and the set of storage devices through the first set of ports of the collection of packaged integrated circuit devices. Communications is passed between the first storage processor and the second storage processor through the second set of ports of the collection of packaged integrated circuit devices.

20 Claims, 11 Drawing Sheets

U.S. PATENT DOCUMENTS

| | | |
|---|---|---|
| 7,080,201 B2 | 7/2006 | Suzuki et al. |
| 2003/0110330 A1 | 6/2003 | Fujie et al. ..................... 710/36 |
| 2004/0083324 A1 | 4/2004 | Rabinovitz et al. |
| 2005/0210188 A1 | 9/2005 | Mizuno et al. .............. 711/112 |
| 2005/0235072 A1* | 10/2005 | Smith et al. ................... 710/22 |
| 2006/0242380 A1* | 10/2006 | Korgaonkar et al. ........ 711/170 |

FOREIGN PATENT DOCUMENTS

EP     1 357 476 A2    10/2003

* cited by examiner

MANAGING SERIAL ATTACHED SMALL COMPUTER SYSTEMS INTERFACE COMMUNICATIONS

RELATED APPLICATIONS

This application is a continuation-in-part application claiming priority to co-pending U.S. patent application Ser. No. 11/169,473, filed Jun. 29, 2005 entitled TECHNIQUES FOR PROVIDING COMMUNICATIONS IN A DATA STORAGE SYSTEM USING A SINGLE IC FOR BOTH STORAGE DEVICE COMMUNICATIONS AND PEER-TO-PEER COMMUNICATIONS, which is assigned to the same assignee as the present invention, and which is incorporated herein by reference in its entirety.

TECHNICAL FIELD

This invention relates generally to data storage systems and more particularly to an expandable redundant array of independent disk (RAID) data storage systems.

BACKGROUND

As is known in the art, large mainframe computer systems and data servers sometimes require large capacity data storage systems. One type of data storage system is a magnetic disk storage system. Here a bank of disk drives and the computer systems and data servers are coupled together through an interface. The interface includes storage processors that operate in such a way that they are transparent to the computer. That is, data is stored in, and retrieved from, the bank of disk drives in such a way that the mainframe computer system or data server merely thinks it is operating with one mainframe memory. One type of data storage system is a RAID data storage system. A RAID data storage system includes two or more disk drives in combination for fault tolerance and performance.

As is also known in the art, it is sometimes desirable that the data storage capacity of the data storage system be expandable. More particularly, a customer may initially require a particular data storage capacity. As the customer's business expands, it would be desirable to corresponding expand the data storage capacity of the purchased storage system.

Small Computer Systems Interface ("SCSI") is a set of American National Standards Institute ("ANSI") standard electronic interface specifications that allow, for example, computers to communicate with peripheral hardware.

SCSI interface transports and commands are used to interconnect networks of storage devices with processing devices, e.g., using serial SCSI transport media and protocols such as Serial Attached SCSI ("SAS").

A typical data storage system includes storage processing circuitry and an array of disk drives. The storage processing circuitry stores data into and retrieves data from the array of disk drives on behalf of external host computers. In some conventional data storage systems, the storage processing circuitry includes a Serial Attached SCSI interface (SAS) integrated circuit (IC) which communicates with the array of disk drives using the SAS protocol. The SAS IC enables the storage processing circuitry to operate as a SAS initiator by providing SAS commands to the array of disk drives. The array of disk drives operates as a set of SAS targets by responding to the SAS commands (e.g., by reading and writing data in response to the SAS commands). A typical data storage system may also include a SAS expander integrated circuit (IC). The SAS expander IC acts as a router allowing one SAS port's communications to be selectively routed to a number of different SAS targets.

One conventional data storage system includes two storage processors for high availability. Each storage processor includes a respective SAS IC having a send port and a receive port for each disk drive. Accordingly, if one storage processor fails, the other storage processor has access to each disk drive and can attempt to continue operation.

In the above-described conventional data storage system, each storage processor further includes a parallel bus device which is separate from the SAS IC of that storage processor. A direct memory access (DMA) engine of each storage processor then engages in DMA-based store and retrieve operations through the parallel bus devices to form a cache mirroring interface (CMI) path between the storage processors. As a result, each storage processor is capable of mirroring data in the cache of the other storage processor. With data mirrored in the caches, the storage processors are capable of operating in a write-back manner for improved response time (i.e., the storage processors are capable of committing to data storage operations as soon as the data is mirrored in both caches since the data remains available even if one storage processor fails).

SUMMARY OF THE INVENTION

Data storage equipment includes a first storage processor comprising a processing circuit and a collection of packaged integrated circuit devices which has a first set of ports and a second set of ports; a second storage processor; and an interconnect coupled between the first and second storage processors. The processing circuit of the first storage processor is adapted to execute as follows. The collection of packaged integrated circuit devices of the first storage processor is configured to provide (i) communications to a set of storage devices through the first set of ports of the collection of packaged integrated circuit devices and (ii) other communications to the second storage processor through the second set of ports of the collection of packaged integrated circuit devices. Communications is passed between the first storage processor and the set of storage devices through the first set of ports of the collection of packaged integrated circuit devices. Communications is passed between the first storage processor and the second storage processor through the second set of ports of the collection of packaged integrated circuit devices.

One or more embodiments of the invention may provide one or more of the following advantages.

The elimination of parallel-bus DMA-based CMI path communications between storage processors decreases the amount of separate circuit board components and substantial reduces printed circuit board (PCB) size and resources required to support parallel-bus DMA board components.

The use of SAS package ICs for both communications between the storage processor and the data storage devices and between the two storage processors through the CMI path saves PCB real estate reduce cost and increase manufacturability. The robustness and reliability of CMI communications path is increased by the use of multiple SAS communication channels which are available in packaged SAS ICs. Communication protocols for peer-to-peer storage processor communications of CMI of data storage information is simplified by the use a common SAS interface between storage processors and between the storage processor and the data storage.

Other advantages and features will become apparent from the following description, including the drawings, and from the claims.

DESCRIPTION OF DRAWINGS

The foregoing and other features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

Like reference symbols in the various drawings indicate like elements.

DETAILED DESCRIPTION

Figure 1:
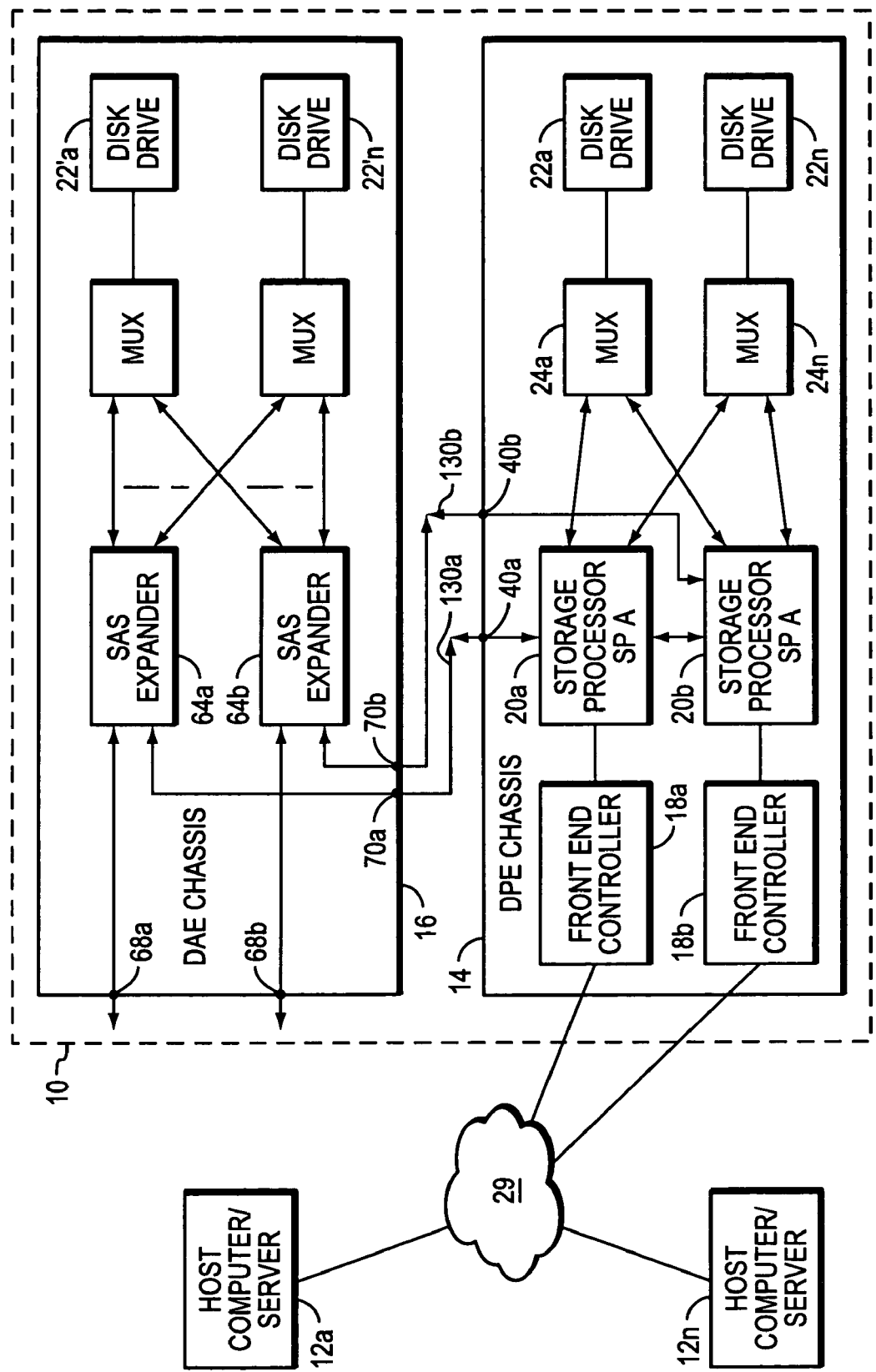
FIGS. 1-3 are block diagrams of a RAID data storage system with SAS expansion.

As described above, storage processors conventionally use SAS ICs to communicate with the array of disk drives, and parallel bus devices to communicate with each other. The use of SAS ICs for disk drive communications and separate parallel bus devices for CMI path communications consumes substantial printed circuit board (PCB) resources. In particular, these separate circuit board components require respective mounting locations, adjacent support circuits, and space for signal traces leading to and from these mounting locations and support circuits. Furthermore, since the storage processors carry out DMA operations through the parallel bus devices (i.e., for cache mirroring), additional design precautions are needed to prevent a failure of one storage processor from locking the parallel bus device of the remaining storage processor and in turn hanging the remaining storage processor.

In contrast to the above-described conventional data storage system having storage processors with separate SAS ICs for SAS disk drive communications and parallel bus devices for DMA-based CMI path communications, improved techniques utilize a packaged IC device having a first set of ports for storage device communications and a second set of ports for peer-to-peer storage processor communications. That is, when this single IC is properly configured on a storage processor, this single IC is capable of operating as an interface to both (i) storage devices (e.g., for synchronizing cache memory with disk drive memory) and (ii) another storage processor (e.g., for cache mirroring between storage processors). Such techniques save PCB real estate as well as alleviate the need to provide parallel-bus DMA-based communications between storage processors.

One embodiment is directed to a data storage system having a set of storage devices, a first storage processor, and a second storage processor for storing data into and retrieving data from the set of storage devices on behalf of a set of external host computers. The first storage processor includes a CPU processing circuit and a packaged IC device which has a first set of ports connected to an expander IC and a second set of ports. The CPU processing circuit is adapted to configure the packaged IC device to provide (i) communications to the set of storage devices through the first set of ports via the expander IC and (ii) other communications to the second storage processor through the second set of ports. The CPU processing circuit is further adapted to pass communications between the first storage processor and the set of storage devices through the expander connected to the first set of ports of the packaged IC device; and pass communications between the first storage processor and the second storage processor through the second set of ports of the packaged IC device. Such an embodiment provides very efficient use of circuit board resources, and robust communications (e.g., SAS, SCSI, Fibre Channel, etc.) within the data storage system.

FIG. 1 shows a data storage system 10 which is configured to store and retrieve data on behalf of a set of external host computers 12a, ..., 12n (collectively, external host computers 12). The data storage system 10 is capable of connecting to the external host computers 12 through a network 29 (e.g., in a SAN-configuration, in a NAS-configuration, as part of a LAN, through the Internet, etc.). The data storage system 10 includes a plurality of, here for example, two chassis or enclosures 14, 16, as shown. Enclosure 14 is sometimes referred to herein as a Disk Processor Enclosure (DPE) and enclosure 16 is sometimes referred to herein as a Disk Array Enclosure (DAE). The DPE 14 and DAE 16 will be described in more detail in connection with FIGS. 2 and 3, respectively. Suffice it to say here that DPE 14 includes a pair of front end controllers 18a, 18b, each having a pair of ports coupled to the pair of host computer/servers 12a ..., 12n through a network 29 (e.g., in a SAN-configuration, in a NAS-configuration, as part of a LAN, through the Internet, etc.), as shown. The DPE 14 also includes a pair of storage processors 20a, 20b coupled to each other with storage processor 20a being connected to front end controller 18a and storage processor 20b being connected to front end controller 18b, as shown. The storage processors 20a and 20b are connected to a bank of disk drives 22a-22n though a plurality of multiplexers 24a-24n, as shown.

The storage processors 20a, 20b of DPE 14 are connected to the DAE 16 though a pair of cables 130a, 130b, respectively, as shown. As will be described in more detail in connection with FIG. 3, the DAE 16 includes additional disk drives 22'a-22'n, here for example, twelve disk drives, and is used to increase the storage capacity of the data storage system 10. Thus, in this example, the number of disk drives 22a-22n in DPE 14 is twelve and the user has chosen to expand the storage capacity to twenty four disk drives by connecting the DAE 16 which in this example includes twelve disk drives 22'a-22'n.

Figure 2:
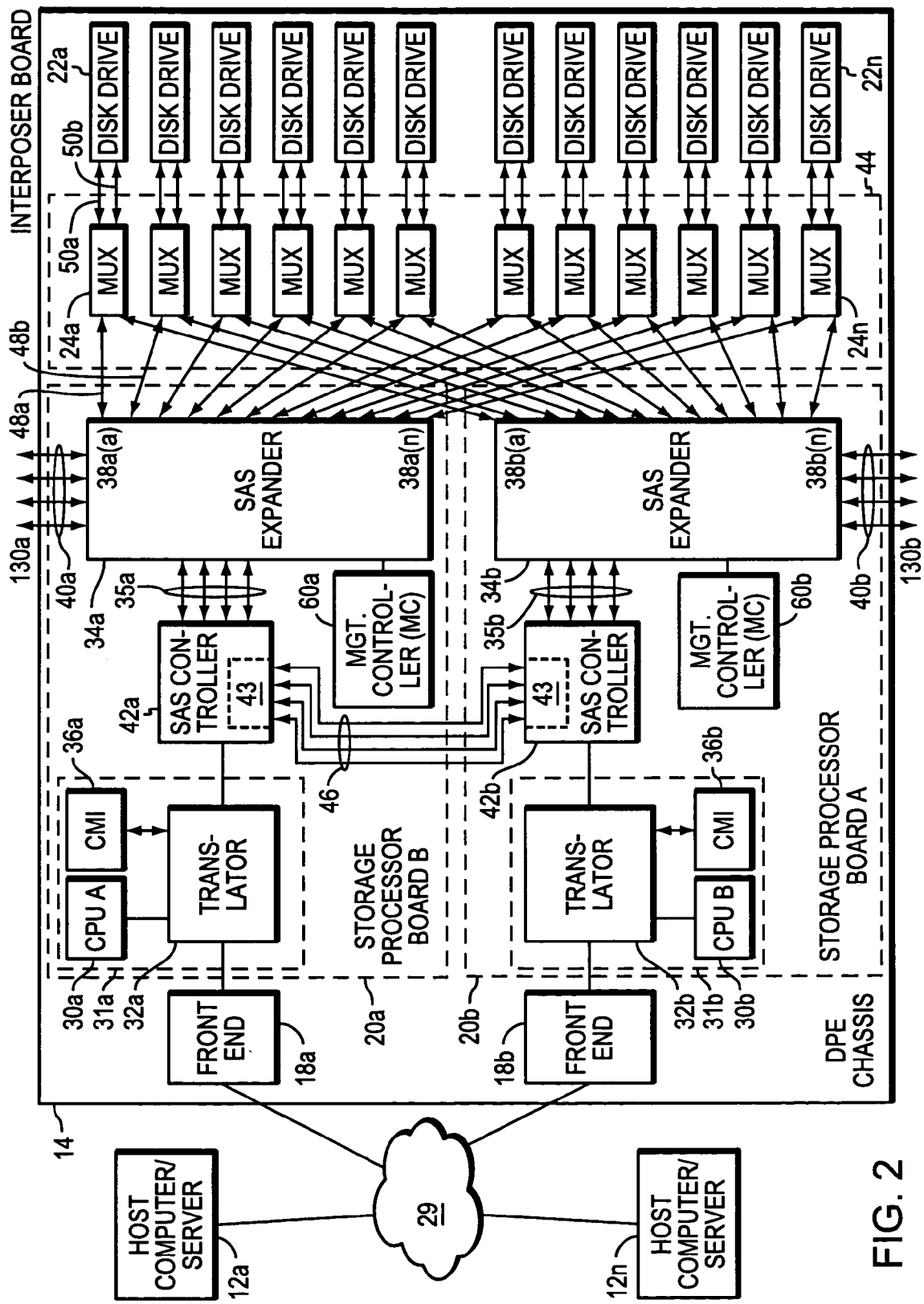

Referring now to FIG. 2, the DPE 14 is shown to include the pair of storage processors 20a, 20b, each disposed on a corresponding one of a pair of printed circuit boards storage processor (SP) board A, 20a and storage processor (SP) board B 20b, respectively, as indicated. Each one of the printed circuit boards has disposed thereon: (a) a processor 30; (b) a translator 32 controlled by the processor 30; (c) a SAS expander 34a on storage processor (SP) board A and SAS expander 34b on storage processor (SP) board B each having a bidirectional front end port 35 and a plurality of bidirectional backend ports 38a-38n, and an expansion port 40a for storage processor (SP) board A and 40b storage processor (SP) board B; and (d) a SAS controller 42 coupled between the translator 32 and the expander controller 34; as shown. The DPE 14 also includes an interposer printed circuit board 44 having thereon the plurality of, here twelve, multiplexers 24a-24n.

Each one of the multiplexers 24a-24n has: (a) a pair of bidirectional front end ports 48a, 48b; and (b) a pair of bidirectional back end ports 50a, 50b. For each one of the plurality of multiplexers 24a-24n, a first one of the pair of bidirectional front end ports for example port 48a is connected to a corresponding backend port 38a of the SAS expander 34a disposed on a first one of the pair of storage processor printed circuit boards, here storage processor (SP) board A; and a second one of the pair of bidirectional front end ports 48b is connected to a corresponding backend port 38n of the SAS expander 34b disposed on a second one of the pair of storage processor printed circuit boards here storage processor (SP) board B.

As noted above, the DPE 14 includes a plurality of disk drives 22a-22n. Each one of the disk drives is coupled to at least one backend port 50a, 50b of a corresponding one of the plurality of multiplexers 22a-22n. More particularly, in the disk drive 22a-22n is a SAS disk drive having a pair of ports, as shown in FIG. 2, the pair of ports is connected to the pair of backend ports of the multiplexer; on the other hand, if the disk drive is a SAS disk drive having a single port the signal port is connected to only one of the pair of backend ports of the multiplexer.

The DPE 14 also includes a pair of management controllers 60, each one being disposed on a corresponding one of the pair of storage processor printed circuit boards here storage processor (SP) board A and here storage processor (SP) board B, as shown. A first of the pair of management controllers 60, here the controller 60 disposed on storage processor (SP) board A includes an additional front end port 35a of the SAS expander 34 disposed on such storage processor printed circuit boards and the second one of the pair of management controllers 60 disposed on the storage processor (SP) board B is coupled to an additional front end port 35b of the SAS expander 34, as shown.

Figure 3:
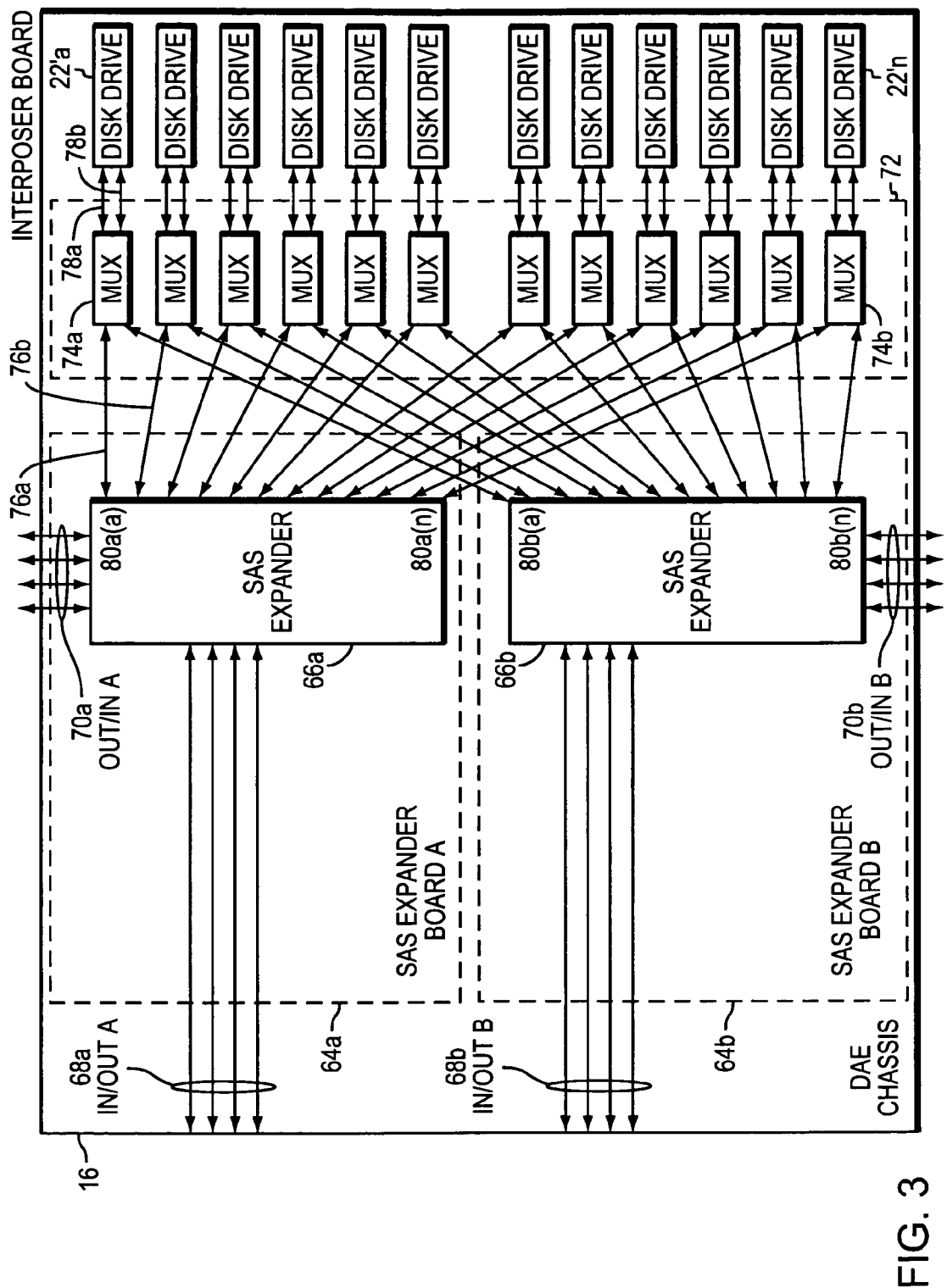

Referring now to FIG. 3, DAE 16 is shown to include a pair of SAS expander printed circuit boards 64a, 64b, a pair of SAS expanders 66a, 66b, each one being disposed on a corresponding one of the pair of SAS expander printed circuit boards 64a, 64b, each one of the pair of SAS expanders 66a, 66b has a bidirectional front end expansion port 68a, 68b, respectively, and a bidirectional backend expansion port 70a, 70b, respectively.

Also included in DAE 16 is an interposer printed circuit 72 board. A plurality of, here twelve, multiplexers 74a-74n is disposed on the interposer printed circuit board 72, each one of the plurality of multiplexers 74a-74n includes (a) a pair of bidirectional front end ports 76a, 76b; (b) a pair of bidirectional back end ports 78a, 78b. For each one of the multiplexers 74a-74n, a first one of the pair of bidirectional front end ports here port 76a, for example, is connected to a corresponding one of backend ports 80a-80n of the SAS expander 66a and a second one of the pair of bidirectional front end ports, here 76b, for example, is connected to a corresponding backend port of the SAS expander 66b as shown. The DAE 16 includes, as noted above, the plurality of disk drives 22'a-22'n, each one being coupled to at least one backend port 78a, 78b of a corresponding one of the plurality of multiplexers 74a-74n. More particularly, in the disk drive 22'a-22'n is a SAS disk drive having a pair of ports, as shown in FIG. 3, the pair of ports is connected to the pair of backend ports of the multiplexer; on the other hand, if the disk drive is a SAS disk drive having a single port the signal port is connected to only one of the pair of backend ports of the multiplexer.

Referring again also to FIGS. 1 and 2, the bidirectional front end expansion ports 40a, 40b of SAS expanders 34a, 34b are connected to the expansion ports 70a, 70b, respectively, as shown. Thus, SAS expander 34a is connected to SAS expander 64a through cable 130a and SAS expander 34b is connected to SAS expander 64b through cable 130b. Thus, referring to FIG. 1, data can pass between any one of the host computer/servers 12a, . . . , 12n and any one of the here twenty four disk drives 22a-22n and 22'a-22'n.

Thus, the data storage system 10 (FIG. 1) may be further expanded in a cabinet here having four DAEs 16 and a DPE 12. As noted above, here a DPE has up to 12 disk drives, and each one of the four DAEs, has 12 disk drives to provide, in this example, a data storage system having up to 60 disk drives.

Each one of the cables includes four SAS lanes so that at any one instant in time, at most 4 messages can be going to 4 different drives, but successive messages can be sent to different drives using the same SAS lane. Those 4 lanes are also used to send traffic to drives on downstream expanders, so a message can be sent on one of the input lanes and out one of the 4 output lanes to an input lane on the next enclosure.

Here, in the DPE there are eight lanes between the translator and the SAS controller; four SAS lanes between the pair of SAS controllers; one SAS lane between each multiplexer and a backend SAS port; and four lanes at each of the expansion ports 40a, 40b. For each DAE there are four SAS lanes between each one of the ports 70a, 70b and the connected one of the pair of SAS expanders 64a, 64b, respectively, and one SAS lane between each multiplexer and a backend SAS port.

Improved techniques utilize a packaged integrated circuit (IC) SAS expander device which has a first set of ports for storage device communications and a second set of ports in the SAS controller for peer-to-peer storage processor communications. That is, when this set of ICs is properly configured on a storage processor, this set of ICs is capable of operating as an interface to both (i) storage devices (e.g., for synchronizing cache memory with disk drive memory) and (ii) another storage processor (e.g., for cache mirroring between storage processors). Such techniques save printed circuit board (PCB) real estate as well as alleviate the need to provide parallel-bus direct memory access based (DMA-based) communications between storage processors.

Figure 4:
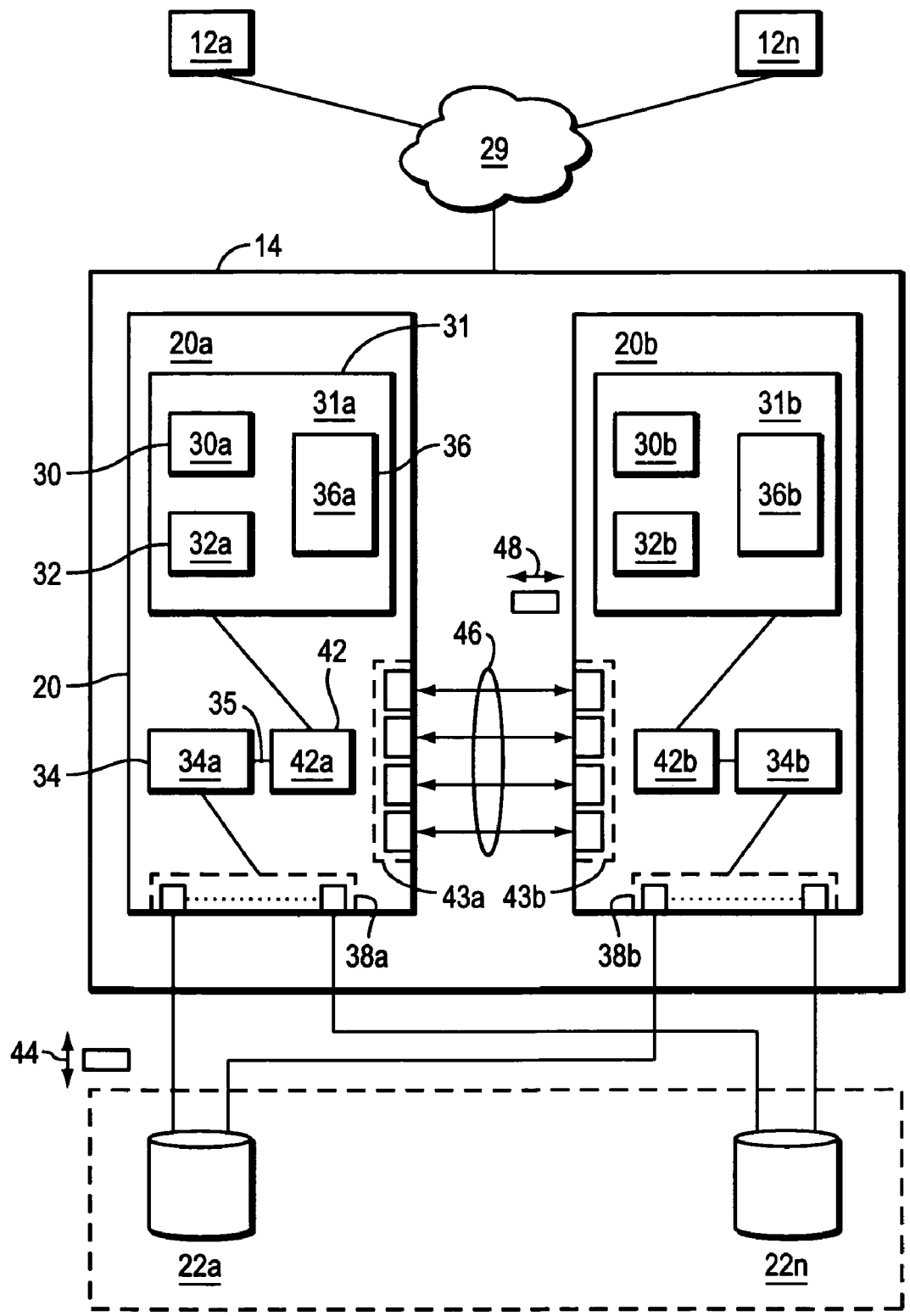
FIG. 4 is a block diagram of a data storage system having packaged IC devices for both storage device communications and peer-to-peer storage processor communications.

FIG. 4 shows a data storage system 10 which is configured to store and retrieve data on behalf of a set of external host computers 12a, . . . , 12n (collectively, external host computers 12). The data storage system 10 is capable of connecting to the external host computers 12 through a network 29 (e.g., in a SAN-configuration, in a NAS-configuration, as part of a LAN, through the Internet, etc.).

As shown in FIG. 4, the data storage system 10 includes a set of storage devices 22a, . . . , 22n (collectively, storage devices 22), a storage processor 20a, and another storage processor 20b (collectively, storage processors 20). Each storage processor 20 includes, among other things, a processing circuit 31 and a packaged SAS controller IC device 42 and an SAS expander IC 34. For example, the storage processor 20a includes a processing circuit 31a and a packaged SAS controller IC device 42a and an SAS expander IC 34a. Similarly, the storage processor 20b includes a processing circuit 31*b* and a packaged SAS controller IC device 42*b* and an SAS expander IC 34*b*. It should be understood that two storage processors 20*a* and 20*b*, are shown by way of example only, and that other numbers of storage processors 20 are suitable for use by the data storage system 10 (e.g., three, four, and so on). Moreover, such storage processors 20 are capable of residing on a single PCB or on multiple PCBs.

The packaged IC device 42 of each storage processor 20 includes a first set of SAS ports 35 and a second set of ports 43. For example, the SAS packaged IC device 42*a* of the storage processor 20*a* includes a first set of ports 35*a* and a second set of ports 43*a*. Similarly, the SAS packaged IC device 42*b* of the storage processor 20*b* includes a first set of ports 35*a* and a second set of ports 43*b*. The first sets of ports 35*a*, 35*b* connect to the a packaged SAS expander IC 34*a*, 34*b* which connect to a set of storage devices 22 to enable the respective processing circuit 31*a*, 30*b* to store and retrieve data 44 through the first sets of ports 35*a*, 35*b*. In some arrangements, the storage devices 22 are dual ported disk drives thus enabling the packaged IC device 42 of each storage processor 20 to have direct access (e.g., through the first set of ports 35 through ports 38 of the packaged SAS expander IC device 34 and associated cables) to each disk drive. The second sets of ports 43*a*, 42*b* connect to each other (e.g., through circuit board traces, and perhaps connectors if the storage processors reside on separate PCBs) to provide peer-to-peer storage processor communications. In particular, the second sets of ports 43 connect with each other to form redundant cache mirroring interface (CMI) paths 46 for synchronizing data 48 within the caches 36. In some arrangements, each second set of ports 43*a*, 42*b* includes exactly four ports to form two CMI links for fault tolerance.

During operation, the processing circuits 31 perform data storage operations on behalf of the host computers 12. In particular, the processing circuit 31*a* stores data into and retrieves data from the storage devices 22 in a non-volatile manner (e.g., see the arrow 44), and may temporarily cache that data within the cache 36*a*. Additionally, the processing circuit 31*a* (i.e., the set of microprocessors 30*a* and the Translator/DMA engine 32*a*) mirrors the data cached within the cache 36*a* by copying that data into the cache 36*b* of the other storage processor 20*b* (e.g., see the arrow 48) via the SAS controllers 42*a* and 42*b*.

Similarly, the processing circuit 31*b* stores data into and retrieves data from the storage devices 22 in a non-volatile manner, and may temporarily cache that data within the cache 36*b*. Furthermore, the processing circuit 31*b* (i.e., the set of microprocessors 30*b*, CMI 36*b* and the Translator/DMA engine 32*b*) mirrors the data cached within the cache 36*b* by copying that data into the cache 36*a* of the other storage processor 20*a*.

Further along these lines, the processing circuits 31 control the operation of the both the packaged SAS expander IC devices 34 packaged SAS controller IC devices 42. In particular, the processing circuit 31*a* configures the packaged SAS expander IC device 34*a* to provide (i) communications to the storage devices 22 through the ports 38 and (ii) configures the packaged SAS controller 42*a* other communications to the other storage processor 20*b* through the ports 43*a*. After such configuration, the processing circuit 31*a* passes communications (i.e., the data 44) to the storage devices 22 through the ports 35*a* of the packaged SAS controller IC device 42*a* to ports 38*a* of the packaged SAS expander 34*a* (i.e., accesses disk drives), and passes communications (i.e., the data 48) to other storage processor 20*b* through the ports 43*a* of the packaged SAS controller IC device 42*a* (i.e., performs cache mirroring through the CMI pathways 46). Accordingly, the storage processor 20*a* does not require separate circuit board components to individually interface with disk drives and another storage processor 20 thus saving PCB resources.

Similar operations occur in the opposite direction. That is, the processing circuits 31 control the operation of the packaged IC devices 42. In particular, the processing circuit 31*b* configures the packaged SAS IC device 34*b* to provide (i) communications to the storage devices 22 through the ports 38*b* and (ii) other communications to the other storage processor 20*a* through the ports 43*b*. After such configuration, the processing circuit 31*b* passes communications (i.e., the data 44) to the storage devices 22 through the ports 35*b* of the packaged SAS controller IC device 42*b* to ports 38*b* of the packaged SAS expander 34*b* (i.e., accesses disk drives), and passes communications (i.e., the data 48) to other storage processor 20*b* through the ports 43*b* of the packaged SAS controller IC device 42*b* (i.e., performs cache mirroring through the CMI pathways 46). Accordingly, the data storage system 10 efficiently utilizes PCB resources (e.g., PCB real estate) using a single packaged SAS controller IC device 42 and a singe packaged SAS expander IC device 34 on each storage processor 20 as the interface between that storage processor 20 and the storage devices 22 as well as between storage processors 20. Further details will now be provided with reference to FIGS. 2 and 3.

Figure 5:
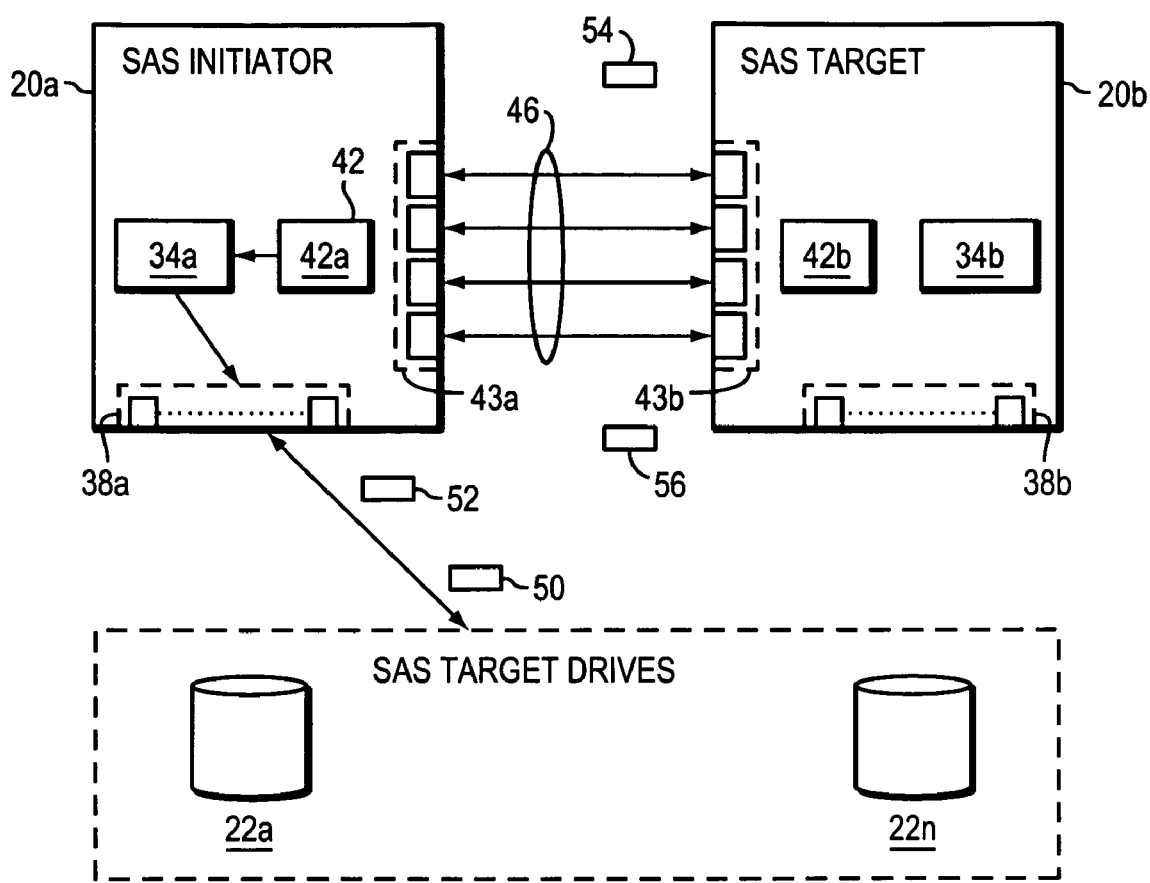
FIG. 5 is a block diagram illustrating operation of storage processors of the data storage system of FIG. 4.

FIGS. 2-5 illustrate the capabilities of the packaged SAS controller IC device 42 and the SAS expander IC 34 of the storage processors 20 when both the packaged SAS controller IC devices 42 and the SAS expander IC 34 are implemented in accordance with the SAS protocol. In particular, FIG. 5 shows the packaged SAS controller IC device 42*a* operating as a SAS initiator with respect to each of the storage devices 22 via the packaged SAS expander 34*a*. Here, the packaged SAS controller IC device 42*a* is capable of issuing read and write operations to the storage devices 22 by providing SAS commands 50 to the storage devices 22 through the ports 38*a* (also see the data 44 in FIG. 4). The storage devices 22 reply to the SAS commands 50, as SAS targets, by sending SAS responses 52 back to the packaged SAS controller 42*a* via the ports 38*a* of the packaged SAS expander IC device 34*a*.

Figure 6:
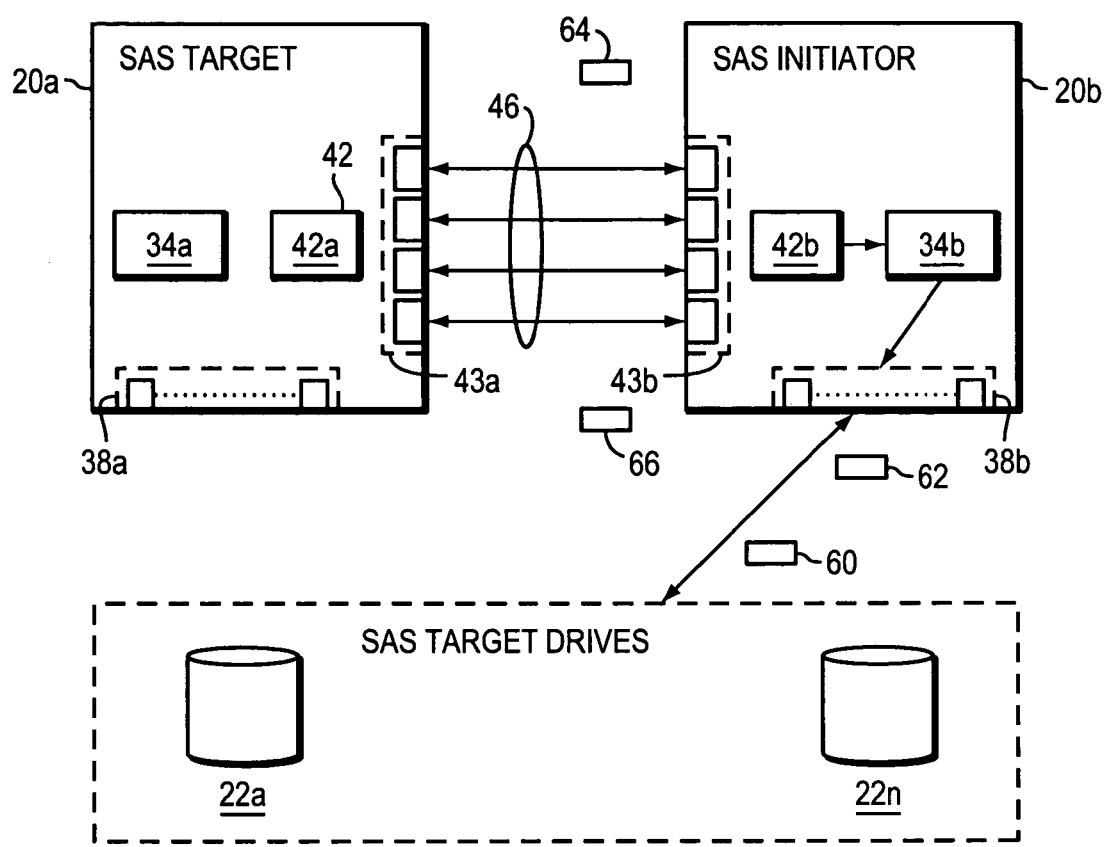
FIG. 6 is a block diagram illustrating further operation of storage processors of the data storage system of FIG. 4.

Similarly, FIG. 6 shows the packaged SAS controller IC device 42*b* via the packaged SAS expander IC device 34*b* operating as a SAS initiator with respect to the storage devices 22. Here, the packaged SAS controller IC device 42*b* is capable of issuing read and write operations to the storage devices 22 by providing SAS commands 60 to the storage devices 22 through the ports 38*b*. The storage devices 22 reply to the SAS commands 60, as SAS targets, by sending SAS responses 62 back to the packaged SAS controller 42*b* via the ports 38*b* of the packaged SAS expander IC device 34*b*.

Furthermore, the packaged IC devices 42*a*, 42*b* are capable of operating as either a SAS initiator or a SAS target with respect to each other to form a valid CMI pathway. In particular, FIG. 5 shows the packaged SAS controller IC device 42*a* issuing SAS commands 54 to the other storage processor 20*b*. Along these lines, the packaged SAS controller IC device 42*a* provides the SAS commands 54 to the packaged SAS controller IC device 42*b* through the ports 43*a* of the packaged SAS controller IC device 42*a* and through the ports 43*b* of the packaged SAS controller IC device 42*b* (also see the data 48 in FIG. 4). The packaged SAS controller IC device 42*b* replies to the SAS commands 54 (i.e., the packaged SAS controller IC device 42*b* acts as a SAS target) by sending SAS responses 56 back to the packaged SAS controller IC device 42*a* through the ports 43*b*, 43*a*. Additionally, as shown in FIG. 6, the packaged SAS controller IC device 42*b* is similarly capable of issuing SAS commands 64 to the other storage processor 20a. Along these lines, the packaged SAS controller IC device 42b provides the SAS commands 64 to the packaged SAS controller IC device 42a through the ports 43b of the packaged SAS controller IC device 42b and through the ports 43a of the packaged SAS controller IC device 42a. The packaged SAS controller IC device 42a replies to the SAS commands 64 (i.e., the packaged SAS controller IC device 42a now acts as a SAS target) by sending SAS responses 66 back to the packaged SAS controller IC device 42b through the ports 43a, 43b. Such peer-to-peer communications (i.e., the device 42a operating as a SAS initiator while the device 42b operates as a SAS target, and also the device 42b operating as a SAS initiator while the device 42a operates as a SAS target) forms a robust CMI pathway 46 between the storage processors 20 without the need for parallel-bus DMA-based communications through the CMI pathway as in conventional systems.

It should be further understood that each the packaged SAS controller IC devices 42 and the packaged SAS expander IC 34 are thus capable of operating as both a SAS initiator and a SAS target in a substantially contemporaneous manner. That is, the packaged SAS controller IC devices 42 and the packaged SAS expander IC 34 are configured to perform the operations illustrated in FIGS. 2 and 3 at the same time in an ongoing manner. In particular, for each connected pair of ports 43, the ports 38 on devices 42 and 34 respectively operates as a SAS initiator while, on the opposite end, the port 42 on the other devices 42 and 34 respectively operates as a SAS target. Such operation enables each storage processor 20 of the data storage system 10 to employ a single circuit board component as its interface to both the storage devices 22 (for data storage and retrieval) and the other storage processor 20 (for cache mirroring). Moreover, since the Translator/DMA engines 38 are external to the packaged IC devices 42 and 34, the CMI path 46 does not need to carry parallel-bus DMA-based communications. Further details will now be provided with reference to FIG. 7.

Figure 7:
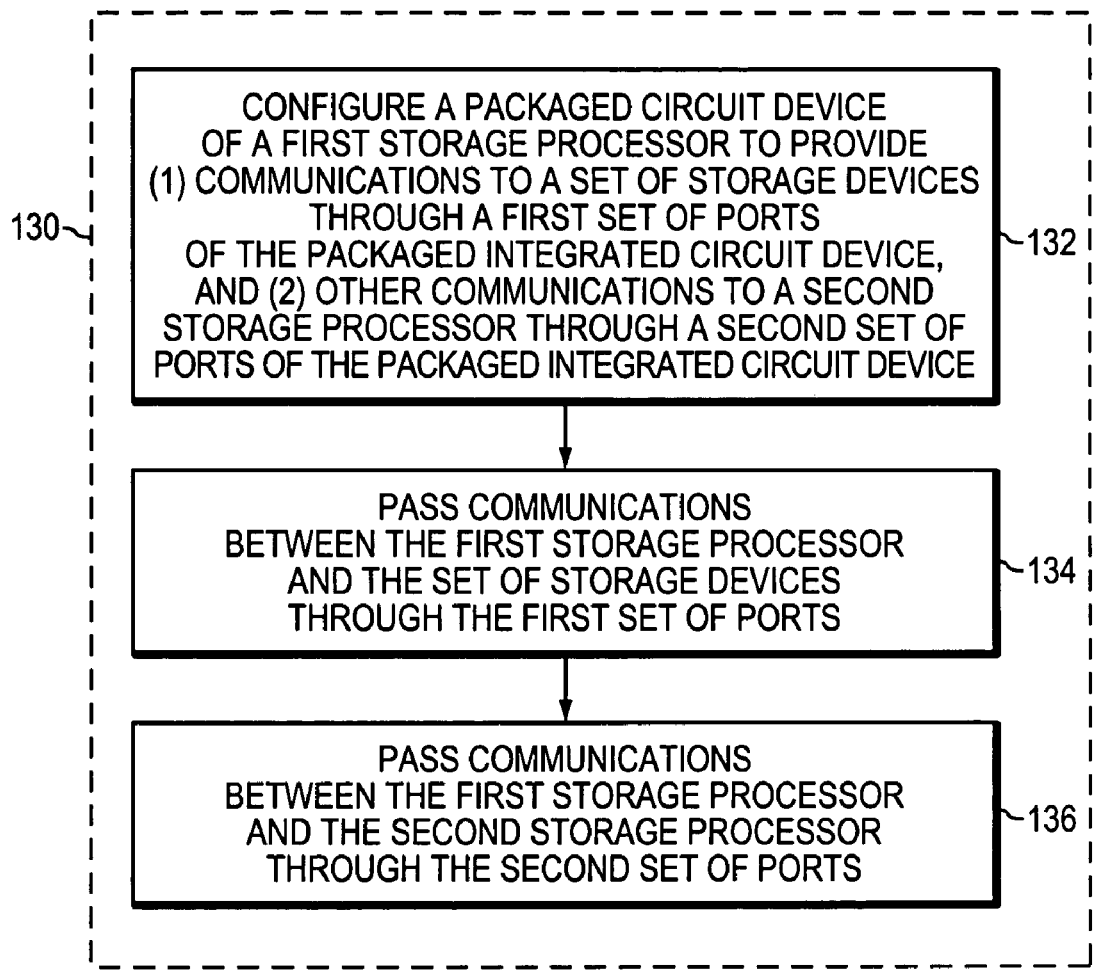
FIG. 7 is a flowchart illustrating a procedure performed by a CPU processing circuit of one of the storage processors of the data storage system of FIG. 4.

FIG. 7 is a flowchart describing a procedure 130 performed by the processing circuit 31 of each storage processor 20 of the data storage system 10. In step 132, the processing circuit 31 (e.g., the processing circuit 31a in FIG. 4) configures a packaged SAS controller IC device 42 (e.g., the device 42a) and a packaged SAS expander IC device 34 (e.g., the device 34a) to provide (i) communications to the storage devices 22 through the ports 38 (e.g., ports 38a) of the packaged SAS expander IC device 34 and (ii) other communications to the other storage processor 20 (e.g., the storage processor 20b) through the ports 43 (e.g., ports 43a) of the packaged SAS controller IC device 42a.

In step 134, the processing circuit 31 is now capable of passing communications 50, 52, 60, 62 between the storage processor 20 and the storage devices 22 through the ports 38. That is, the processing circuit 31 is now capable of storing data into and retrieving data from the storage devices 22.

In step 136, the processing circuit 31 is now capable of passing communications 54, 56, 64, 66 between the storage processor 20 and the other storage processor 20 through the ports 43. That is, the processing circuit 31 is now capable of mirroring cached data between the two storage processors 20 through the CMI path 46. It should be understood that steps 134 and 136 are capable of occurring substantially concurrently in an ongoing manner for robust data storage system operation.

As described above, improved techniques utilize a packaged SAS controller IC device 42 (e.g., the device 42a) and a packaged SAS expander IC device 34 having ports 43 for peer-to-peer storage processor communications and ports 38 for storage device communications respectively. That is, when a packaged SAS controller IC device 42 (e.g., the device 42a) and a packaged SAS expander IC device 34 are properly configured on a storage processor 20, the packaged SAS controller IC device 42 (e.g., the device 42a) and a packaged SAS expander IC device 34 are capable of operating as an interface to both (i) storage devices 22 (e.g., for synchronizing cache memory with disk drive memory) and (ii) another storage processor 20 (e.g., for cache mirroring between storage processors). Such techniques save printed circuit board (PCB) real estate as well as alleviate the need.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the packaged SAS controller IC device 42 (e.g., the device 42a) and the packaged SAS expander IC device 34 were described above as employing the SAS protocol, but that other protocols are suitable for use as well. In other arrangements, packaged IC devices 42 can use protocols other than SAS such as Serial ATA (SATA), Fibre Channel (FC), and the like.

Additionally, it should be understood that each storage processor 20 was described above as including only a packaged SAS controller IC device 42 (e.g., the device 42a) and a packaged SAS expander IC device 34 by way of example only. In other arrangements, each storage processor 20 has multiple packaged IC devices 42, multiple packaged IC devices 34 or combinations of multiple packaged IC devices 43 and 34. In the embodied implementation the CMI path 46 includes four complete SAS channels. That is, the packaged SAS controller IC 42 dedicates four SAS channels to port 43 for CMI communications. One or more of these four CMI SAS ports can be used for CMI communications, allowing higher data communication bandwidth on the CMI path 46. In some arrangements, the four CMI communication ports 43 and be used as multiple CMI paths 46, where a first CMI path 46 extends across a first pair of packaged IC devices 42, and a second CMI path 46 extends across a second pair of packaged IC devices 42 for further fault tolerance. Other embodiments can dedicate more or less SAS channels for CMI communications.

Similarly, in the embodied implementation the path 35 to the SAS expander includes four complete SAS channels. That is, the packaged SAS controller IC 42 dedicates four SAS channels to path 35 for SAS expander communications to the storage devices 22. One or more of these four SAS ports can be used for storage communications, allowing higher data communication bandwidth to the storage devices 22. Other embodiments can dedicate more or less SAS channels for storage communications, or eliminate the SAS expander for storage communications.

Figure 8:
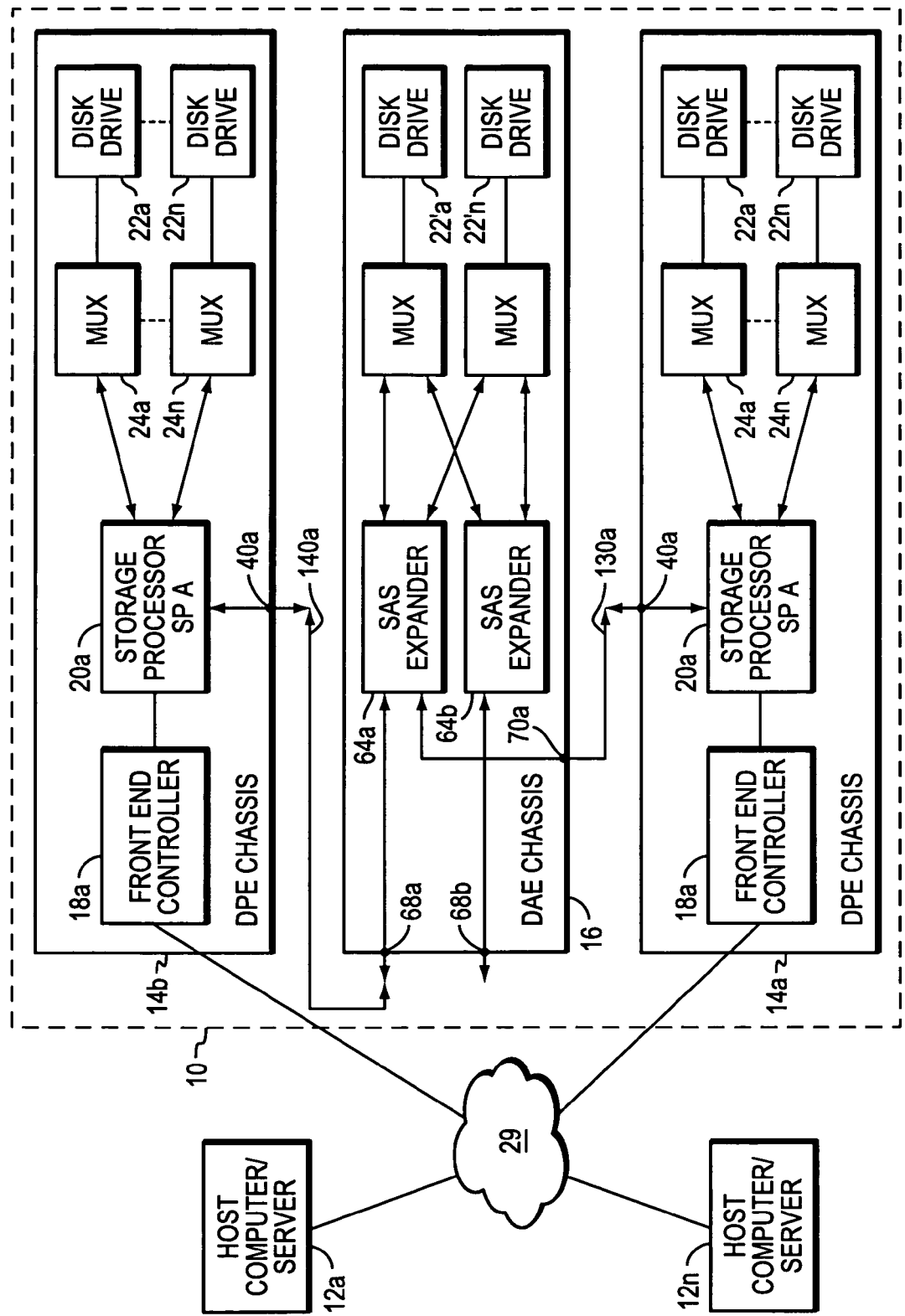
FIG. 8 is a block diagram of a RAID data storage system with SAS expansion using multiple Disk Processor Enclosures (DPE).

Alternate implementations the CMI path between the storage processors 20 are possible. A DPE may only contain one storage processor. Such a configuration offers lower costs in configuration in which the added performance and reliability of a second storage processor in a DPE is not initially necessary. In these situations, additional performance and reliability of a second storage processor can be accomplished by adding a second single storage processor to the DPE. This implementation would have a first set of SAS ports 35 and a second set of ports 40 connected to the SAS expander IC 34. FIG. 8 shows a data storage system 10 which is configured to store and retrieve data on behalf of a set of external host computers 12a, ..., 12n (collectively, external host computers 12). The data storage system 10 is capable of connecting to the external host computers 12 through a network 29 (e.g., in a SAN-configuration, in a NAS-configuration, as part of a LAN, through the Internet, etc.). FIG. 8 shows that the DPEs 14a and 14b include front end controllers 18a, each having a pair of ports coupled to the pair of host computer/servers 12a, ..., 12n through a network 29 (e.g., in a SAN-configuration, in a NAS-configuration, as part of a LAN, through the Internet, etc.), as shown. Each DPE 14 also includes a storage processor 20a connected to front end controller 18a. The storage processors 20a and 20b are connected to a bank of disk drives 22a-22n though a plurality of multiplexers 24a-24n, as shown.

Each of the storage processors 20a from DPEs 14a and 14b are connected to the DAE 16 though a pair of cables 130a, 140a, respectively, as shown. The CMI path from the storage processor of DPE 14a to the storage processor of DPE 14b is through cable 130a, connecting ports 70a of DAE 16 with ports 40a of DPE 14a, with the additional connections of ports 68a of DAE 16 with ports 40a of DPE 14b through cable 140a.

Figure 9:
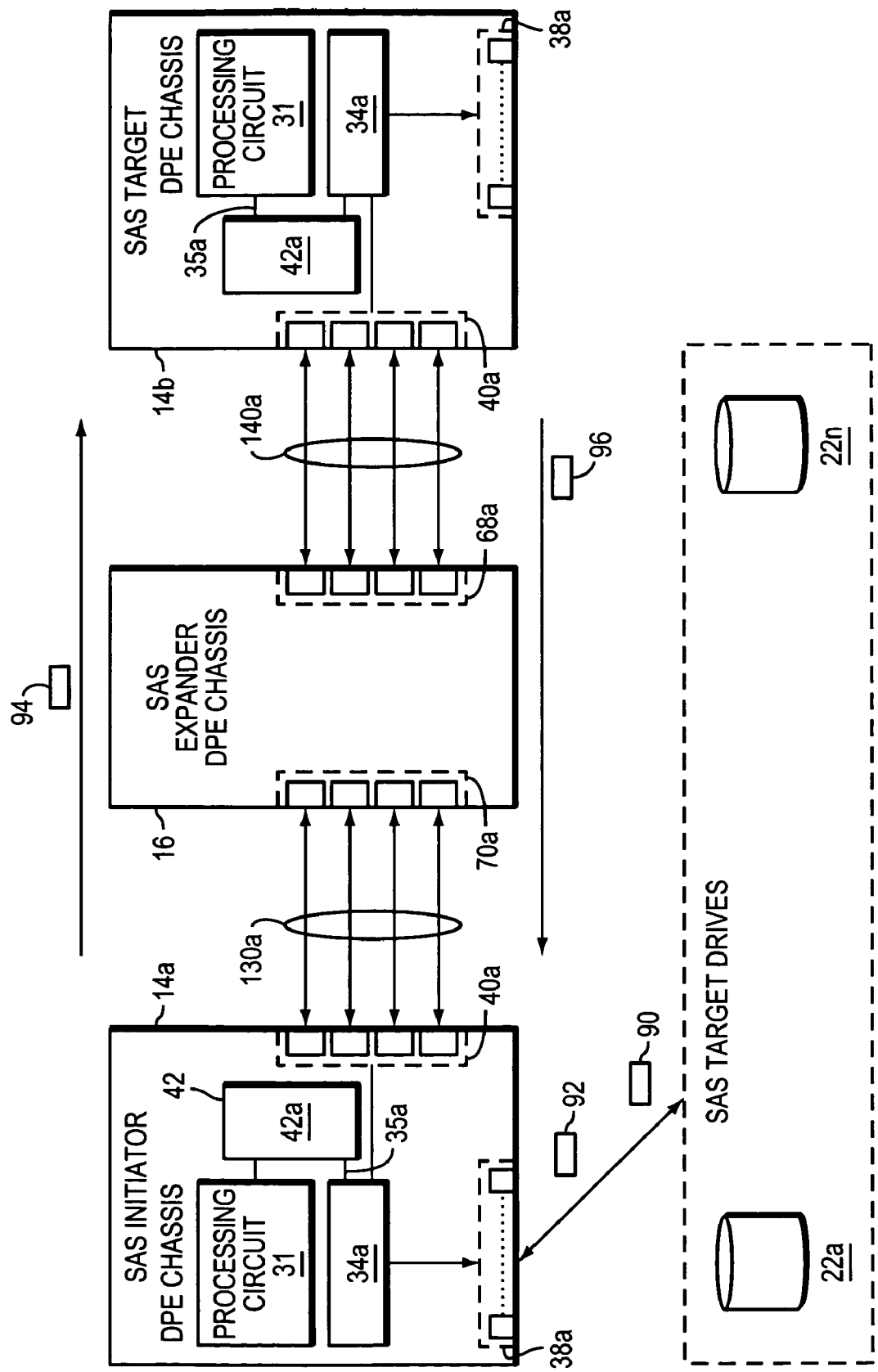
FIG. 9 is a block diagram illustrating operation of storage processors of the data storage system of FIG. 8.
Figure 10:
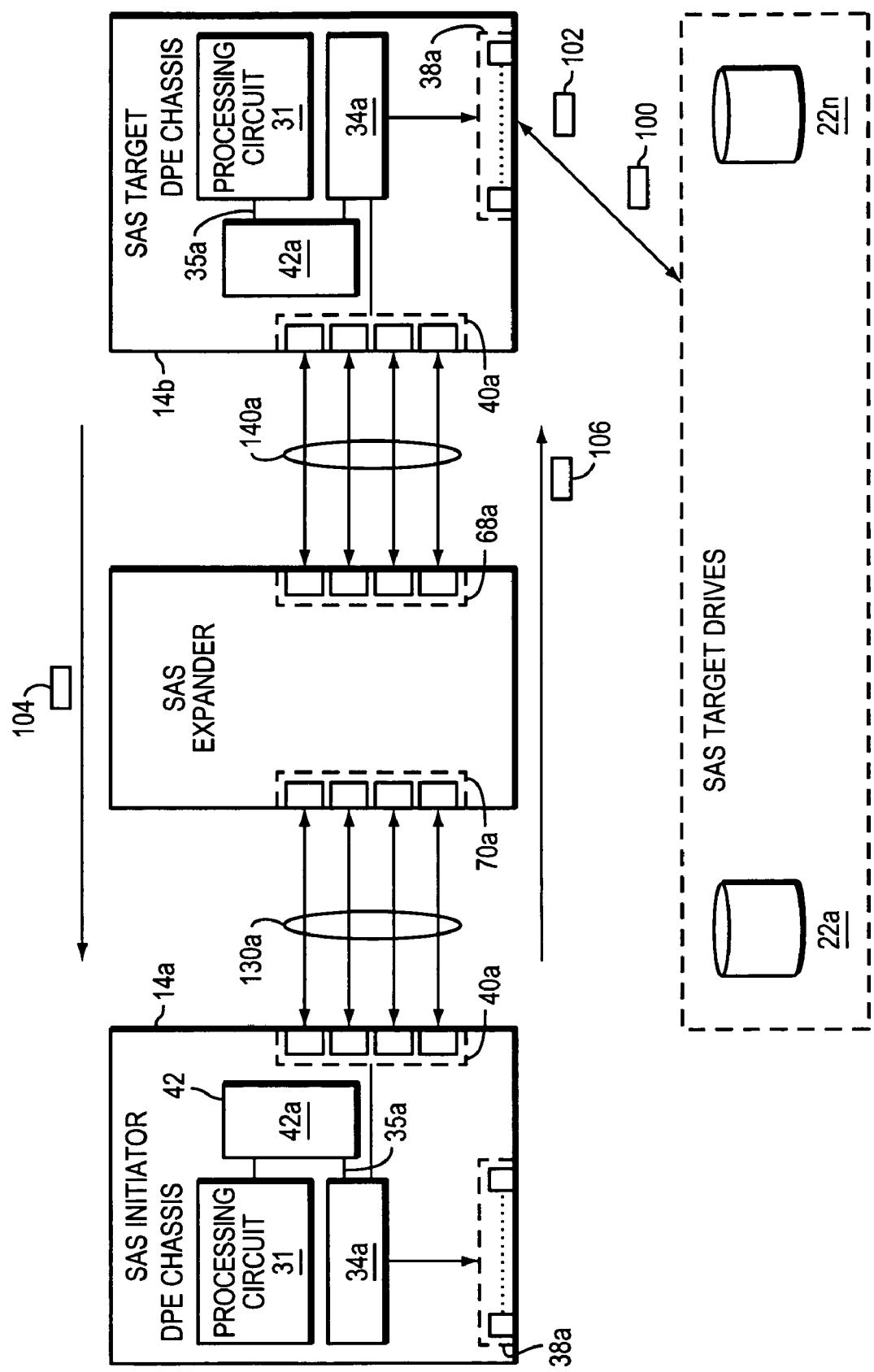
FIG. 10 is a block diagram illustrating further operation of storage processors of the data storage system of FIG. 8.

FIG. 9 shows the packaged SAS controller IC device 42a if DPE 14a operating as a SAS initiator with respect to each of the storage devices 22 via the packaged SAS expander 34a. Here, the packaged SAS controller IC device 42a of DPE 14a is capable of issuing read and write operations to the storage devices 22 by providing SAS commands 90 to the storage devices 22 through the ports 38a. The storage devices 22 reply to the SAS commands 90, as SAS targets, by sending SAS responses 92 back to the packaged SAS controller 42a via the ports 38a of the packaged SAS expander IC device 34a of DPE 14a Similarly, FIG. 10 shows DPE 14b's packaged SAS controller IC device 42a via the packaged SAS expander IC device 34b operating as a SAS initiator with respect to the storage devices 22. Here, the packaged SAS controller IC device 42a of DPE 14b is capable of issuing read and write operations to the storage devices 22 by providing SAS commands 60 to the storage devices 22 through the ports 38b. The storage devices 22 reply to the SAS commands 100, as SAS targets, by sending SAS responses 102 back to the packaged SAS controller 42a via the ports 38a of the packaged SAS expander IC device 34a of DPE 14b.

Furthermore, the packaged IC devices 42a of DPE 14a and 14b are capable of operating as either a SAS initiator or a SAS target with respect to each other to form a valid CMI pathway. In particular, FIG. 9 shows DPE 14a's packaged SAS controller IC device 42a issuing SAS commands 94 to the DPE 14b's storage processor 20a. Along these lines, the packaged SAS controller IC device 42a provides the SAS commands 94 to DPE 14b's packaged SAS controller IC device 42a via the ports 40a of the packaged SAS expander IC device 34a of DPE 14a connecting to ports 70a of DAE 16's SAS expander through cable 130a, which sends the commands through ports 68a to DPE 14b's ports 40a of the packaged SAS expander IC device 34a that is connected to SAS controller IC device 42a (on DPE 14b) through cable 140a. The packaged SAS controller IC device 42a of DPE 14b replies to the SAS commands 94 (i.e., the packaged SAS controller IC device 42a of DPE 14b acts as a SAS target) by sending SAS responses 96 back DPE 14a through the ports 40a (on DPE 14a) to DAE ports 68a via cable 140a which passes the response through ports 70a to DPE 14a via cable 130a. Additionally, as shown in FIG. 10, DPE 14b's packaged SAS controller IC device 42a is similarly capable of issuing SAS commands 104 to DPE 14a's storage processor. Along these lines, DPE 14b's packaged SAS controller IC device 42a provides the SAS commands 104 to DPE 14a through DPE 14b's ports 40a which is connected to DAE 16's SAS expander port 68a by cable 140a. SAS command 106 proceeds from DAE 16 through ports 70a to DPE 14a's ports 40a of the packaged SAS expander IC device 34a that is connected to packaged SAS controller IC device 42a (on 14b) via cable 130a. The packaged SAS controller IC device 42a replies to the SAS commands 104 (i.e., DPE 14a now acts as a SAS target) by sending SAS responses 106 back to DPE 14b's SAS controller IC devices 42a and 34a through the DAE 16.

Figure 11:
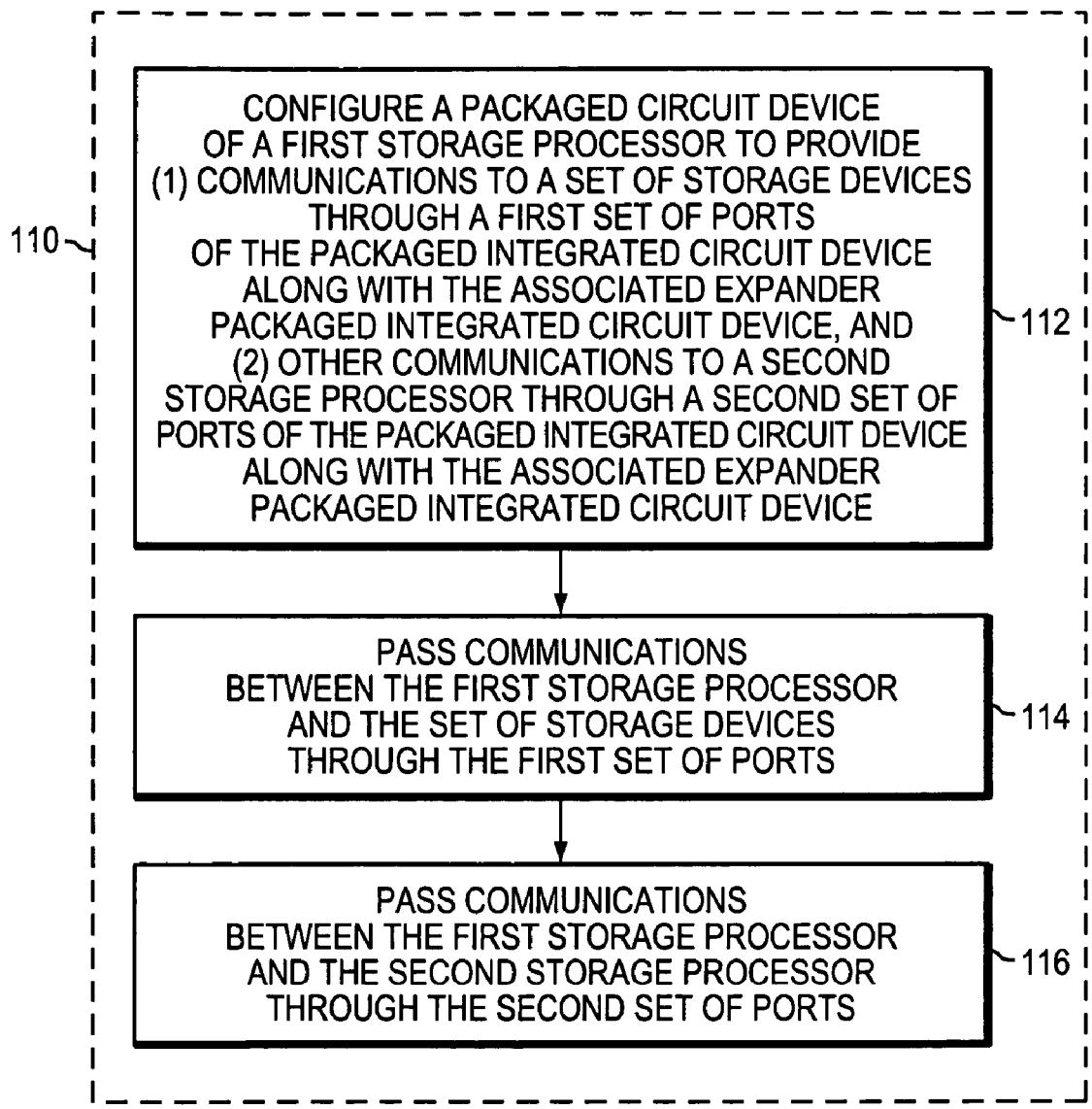
FIG. 11 is a flowchart illustrating a procedure performed by a CPU processing circuit of one of the storage processors of the data storage system of FIG. 8.

FIG. 11 is a flowchart summarizing a procedure 110 performed by the processing circuit 31 of each storage processor 20 of the data storage system 10. In step 112, the processing circuit 31 (e.g., the processing circuit 31 in FIGS. 9,10) of DPE 14a configures a packaged SAS controller IC device 42 (e.g., the device 42a), a packaged SAS expander IC device 34 (e.g., the device 34a) and DAE SAS expander 64a ports 68a, 70a to provide (i) communications to the storage devices 22 through the ports 38 (e.g., ports 38a) of the packaged SAS expander IC device 34 and (ii) other communications to the other storage processor 20 in DPE 14b through the DPE 14a's ports 40 (e.g., ports 40a) of the packaged SAS expander IC device 34a that is connected to the packaged SAS controller IC device 42a through DAE 16's ports 70a and 68a to DPE 14b ports 40a.

In step 114, the processing circuit 31 is now capable of passing communications 90, 92, 100, 102 between the storage processor 20 and the storage devices 22 through the ports 38. That is, the processing circuit 31 is now capable of storing data into and retrieving data from the storage devices 22.

In step 116, the processing circuit 31 is now capable of passing communications 94, 96, 104, 106 between the DPE 14a's storage processor 20 and the other storage processor 20 (DPE 14b) through the ports 40 connected via the DAE. That is, the processing circuit 31 is now capable of mirroring cached data between the two storage processors 20 through the CMI path using cables 130a, 140a. It should be understood that steps 114 and 116 are capable of occurring substantially concurrently in an ongoing manner for robust data storage system operation.

In this alternate implementation CMI communications data storage communication share the four SAS communication channels from the SAS controller IC 42 connecting to the SAS expander IC 34. At any one time the four SAS channels between the SAS controller IC 42 and the SAS expander IC 34, path 35a can be dedicated for either CMI, or data storage communications or any combination thereof. For example two of path 35a channels can be configured for data storage communications and the other two path 35a channels can be configured for CMI communications. The CMI path via cables 130a, 140a includes four complete SAS channels. That is, the packaged SAS controller IC 42 and their associated SAS expander IC 34 on DPE 14a, 14b and the SAS expander 68a on DAE 16 dedicate four SAS channels to port 40 for CMI communications. One or more of these four CMI SAS ports can be used for CMI communications, allowing higher data communication bandwidth on the CMI path 46. In some arrangements, the four CMI communication ports 40 can be used as multiple CMI paths via cables 130a, 140a, where a first CMI path via cables 130a, 140a extends across a first pair of the packaged SAS expander IC device 34 that is connected to the packaged SAS controller IC device 42, and a second CMI path using cables 130a, 140a extends across a second pair of the packaged SAS expander IC device 34 that is connected to the packaged SAS controller IC device 42 for further fault tolerance. Other embodiments can dedicate more or fewer SAS channels for CMI communications.

Other embodiments which eliminate the bank of disk drives 22a-22n connected to the DPE storage processors though a plurality of multiplexers 24a-24n are possible. These embodiments reduce the complexity of the DPE storage processors and centralize the storage in the DAE. Such embodiments enable additional SAS connections, connected to the multiplexers 24a-24n in other embodiments, from the SAS expanders 34a, 34b, to be connected to the DAE through ports 130a, 130b. Alternatively the DPE storage processor's SAS expanders 34a, 34b can be removed further eliminating board components. Embodiments without DPE storage processor's SAS expanders 34a, 34b connect the SAS path 35 from the SAS controller to ports 130s, 130b.

What is claimed is:

1. Data storage equipment, comprising: a first storage processor comprising a processing circuit and a collection of packaged integrated circuit devices which has a first set of ports and a second set of ports; a second storage processor; and an interconnect coupled between the first and second storage processors; wherein the processing circuit of the first storage processor is adapted to: configure the collection of packaged integrated circuit devices of the first storage processor to provide (i) communications to a set of storage devices through the first set of ports of the collection of packaged integrated circuit devices and (ii) other communications to the second storage processor through the second set of ports of the collection of packaged integrated circuit devices; pass communications between the first storage processor and the set of storage devices through the first set of ports of the collection of packaged integrated circuit devices; and pass communications between the first storage processor and the second storage processor through the second set of ports of the collection of packaged integrated circuit devices; wherein the collection of packaged integrated circuit devices are configured to operate concurrently as a SAS initiator through one port and as a SAS target through another port; the second storage processor includes another collection of packaged integrated circuit devices; and wherein the first and second storage processors are adapted to perform direct memory access (DMA) operations outside of multiple cache mirroring interface (CMI) links to isolate the collection of packaged integrated circuit devices from DMA operations.

2. Data storage equipment as in claim 1 wherein the processing circuit, when passing communications between the first storage processor and the set of storage devices, is adapted to:
store data into and retrieving data from the set of storage devices through the first set of ports of the collection of packaged integrated circuit devices on behalf of a set of external host computers.

3. Data storage equipment as in claim 2 wherein the first and second storage processors include respective caches; and wherein the processing circuit, when passing communications between the first storage processor and the second storage processor, is adapted to:
exchange data between the first and second processors through the second set of ports of the collection of packaged integrated circuit devices to mirror the respective caches of the first and second processors.

4. Data storage equipment as in claim 3 wherein the set of storage devices includes disk drives; and wherein the processing circuit, when storing data into and retrieving data from the set of storage devices through the first set of ports of the collection of packaged integrated circuit devices, is adapted to:
operate the collection of packaged integrated circuit devices as a Serial Attached SCSI (SAS) initiator device with respect to the disk drives to control the disk drives as SAS target devices.

5. Data storage equipment as in claim 4 wherein the first storage processor includes another collection of packaged integrated circuit devices which are configured to operate as a SAS initiator device with respect to the disk drives to control the disk drives as SAS target devices; and wherein the processing circuit, when passing communications between the first storage processor and the second storage processor through the second set of ports of the collection of packaged integrated circuit devices, is adapted to:
operate the collection of packaged integrated circuit devices of the first storage processor as a SAS initiator device with respect to the other collection of packaged integrated circuit devices of the second storage processor to command the other collection of packaged integrated circuit devices of the second storage processor as a SAS target device.

6. Data storage equipment as in claim 5 wherein the processing circuit, when passing communications between the first storage processor and the second storage processor through the second set of ports of the collection of packaged integrated circuit devices, is further adapted to:
operate the collection of packaged integrated circuit devices of the first storage processor as a SAS target device with respect to the other collection of packaged integrated circuit devices of the second storage processor to respond to the other collection of packaged integrated circuit devices of the second storage processor when the other collection of packaged integrated circuit devices of the second storage processor operates as a SAS initiator device to provide peer-to-peer communications between the first and second storage processors.

7. Data storage equipment as in claim 5 wherein the processing circuit, when passing communications between the first storage processor and the second storage processor through the second set of ports of the collection of packaged integrated circuit devices or each respected storage processor, is adapted to:
communicate through a Serial Attached SCSI (SAS) expander device.

8. Data storage equipment as in claim 4 wherein the second storage processor includes another collection of packaged integrated circuit devices which are configured to operate as a SAS initiator device with respect to the disk drives to control the disk drives as SAS target devices;
and wherein the processing circuit, when passing communications between the first storage processor and the second storage processor through the second set of ports of the collection of packaged integrated circuit devices, is adapted to:
operate the collection of packaged integrated circuit devices of the first storage processor as a SAS target device with respect to the other collection of packaged integrated circuit devices of the second storage processor to respond to the other collection of packaged integrated circuit devices of the second storage processor when the other collection of packaged integrated circuit devices of the second storage processor operates as a SAS initiator device.

9. Data storage equipment as in claim 3 wherein the first and second sets of ports are contained in the same packaged integrated circuit.

10. Data storage equipment as in claim 3 wherein the first and second sets of ports are contained different packaged integrated circuits.

11. Data storage equipment as in claim 1, wherein the processing circuit of the first storage processor, when configuring the collection of packaged integrated circuit devices of the first storage processor, is adapted to:
program (i) the first set of ports of the collection of packaged integrated circuit devices of the first storage processor to provide multiple communication paths to the disk drives and (ii) the second set of ports of the collection of packaged integrated circuit devices of the first storage processor to provide multiple cache mirroring interface (CMI) links to the second storage processor; and
wherein the processing circuit of the first storage processor is adapted to mirror cached data between the first storage processor and the second storage processor via the CMI links formed between the second set of ports of the collection of packaged integrated circuit devices of the first storage processor and the second storage processor.

12. A method for providing communications within a data storage system having a first storage processor, a second storage processor, and a set of storage devices, the method comprising: configuring a collection of packaged integrated circuit devices of the first storage processor to provide (i) communications to the set of storage devices through a first set of ports of the collection of packaged integrated circuit devices and (ii) other communications to the second storage processor through a second set of ports of the collection of packaged integrated circuit devices; passing communications between the first storage processor and the set of storage devices through the first set of ports of the collection of packaged integrated circuit devices; and passing communications between the first storage processor and the second storage processor through the second set of ports of the collection of packaged integrated circuit devices; wherein the set of storage devices includes disk drives; and wherein storing data into and retrieving data from the set of storage devices through the first set of ports of the collection of packaged integrated circuit devices includes operating the collection of packaged integrated circuit devices as a Serial Attached SCSI (SAS) initiator device with respect to the disk drives to control the disk drives as SAS target devices; wherein configuring the collection of packaged integrated circuit devices of the first storage processor further includes programming (i) the first set of ports of the collection of packaged integrated circuit devices of the first storage processor to provide multiple communication paths to the disk drives and (ii) the second set of ports of the collection of packaged integrated circuit devices of the first storage processor to provide multiple cache mirroring interface (CMI) links to the second storage processor; and further comprising operating the collection of packaged integrated circuit devices concurrently as a SAS initiator through one port and as a SAS target through another port.

13. A method as in claim 12 wherein passing communications between the first storage processor and the set of storage devices includes:
storing data into and retrieving data from the set of storage devices through the first set of ports of the collection of packaged integrated circuit devices on behalf of a set of external host computers.

14. A method as in claim 13 wherein passing communications between the first storage processor and the second storage processor includes:
exchanging data between the first and second processors through the second set of ports of the collection of packaged integrated circuit devices to mirror caches of the first and second processors.

15. A method as in claim 14 wherein the first and second sets of ports are contained in the same packaged integrated circuit.

16. A method as in claim 14 wherein the processing circuit, when passing communications between the first storage processor and the second storage processor through the second set of ports of the collection of packaged integrated circuit devices or each respected storage processor, further includes:
communicating through a Serial Attached SCSI (SAS) expander device.

17. A method as in claim 12 wherein the second storage processor includes another collection of packaged integrated circuit devices which are configured to operate as a SAS initiator device with respect to the disk drives to control the disk drives as SAS target devices; and wherein passing communications between the first storage processor and the second storage processor through the second set of ports of the collection of packaged integrated circuit devices includes:
operating the collection of packaged integrated circuit devices of the first storage processor as a SAS initiator device with respect to the other collection of packaged integrated circuit devices of the second storage processor to command the other collection of packaged integrated circuit devices of the second storage processor as a SAS target device.

18. A method as in claim 17 wherein passing communications between the first storage processor and the second storage processor through the second set of ports of the collection of packaged integrated circuit devices further includes:
operating the collection of packaged integrated circuit devices of the first storage processor as a SAS target device with respect to the other collection of packaged integrated circuit devices of the second storage processor to respond to the other collection of packaged integrated circuit devices of the second storage processor when the other collection of packaged integrated circuit devices of the second storage processor operates as a SAS initiator device to provide peer-to-peer communications between the first and second storage processors.

19. A method as in claim 12 wherein the second storage processor includes another collection of packaged integrated circuit devices which are configured to operate as a SAS initiator device with respect to the disk drives to control the disk drives as SAS target devices; and wherein passing communications between the first storage processor and the second storage processor through the second set of ports of the collection of packaged integrated circuit devices includes:
operating the collection of packaged integrated circuit devices of the first storage processor as a SAS target device with respect to the other collection of packaged integrated circuit devices of the second storage processor to respond to the other collection of packaged integrated circuit devices of the second storage processor when the other collection of packaged integrated circuit devices of the second storage processor operates as a SAS initiator device.

20. A method as in claim 12, further comprising mirroring, by the processing circuit, cached data between the first storage processor and the second storage processor via the CMI links formed between the second set of ports of the collection of packaged integrated circuit devices of the first storage processor and the second storage processor.

* * * * *